United States Patent [19]
Laakso et al.

[11] Patent Number: 6,011,812
[45] Date of Patent: *Jan. 4, 2000

[54] RECEIVING METHOD AND RECEIVER

[75] Inventors: Timo Laakso, Helsinki; Ari Hottinen, Vantaa, both of Finland

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/632,416

[22] PCT Filed: Aug. 23, 1995

[86] PCT No.: PCT/FI95/00451

§ 371 Date: Apr. 24, 1996

§ 102(e) Date: Apr. 24, 1996

[87] PCT Pub. No.: WO96/06487

PCT Pub. Date: Feb. 29, 1996

[30] Foreign Application Priority Data

Aug. 25, 1994 [FI] Finland ..................... 943906

[51] Int. Cl.[7] ............... H04B 15/00; H04B 7/216
[52] U.S. Cl. ............... 375/208; 375/200; 370/342
[58] Field of Search .................... 375/208, 205, 375/206, 200, 207; 370/342, 335, 320, 441, 213, 239; 455/504

[56] References Cited

U.S. PATENT DOCUMENTS

| | | | |
|---|---|---|---|
| 5,345,472 | 9/1994 | Lee | 370/342 |
| 5,377,226 | 12/1994 | Davis | 375/205 |
| 5,414,699 | 5/1995 | Lee | 370/342 |
| 5,638,376 | 6/1997 | Miki et al. | 370/342 |
| 5,757,845 | 5/1998 | Fukawa et al. | 375/200 |

FOREIGN PATENT DOCUMENTS

| | | | |
|---|---|---|---|
| 0 637 143 | 2/1995 | European Pat. Off. | H04B 7/26 |
| WO 95/22208 | 8/1995 | WIPO | H04B 1/10 |

OTHER PUBLICATIONS

Lupas, Ruxandra et al., "Linear Multiuser Detectors for Synchronous Code–Division Multiple–Access Channels", *IEEE Transactions On Information Theory*, vol. 35, No. 1, Jan. 1989, pp. 123–136.

Lupas, Ruxandra et al., "Near–Far Resistance of Multiuser Detectors in Asynchronous Channels", IEEE Transactions On Communications, vol. 38, No. 4, Apr. 1990, pp. 496–508.

Verdu, Sergio, "Recent Progress In Multiuser Detection", *Proc. 1988 Int. Conf. Advances In Communications and Control Systems*, vol. 1, Baton Rouge, La., Oct. 1988, pp. 27–38.

*Primary Examiner*—Chi H. Pham
*Assistant Examiner*—Khai Tran
*Attorney, Agent, or Firm*—Pillsbury Madison & Sutro LLP

[57] ABSTRACT

A receiving method and a receiver in a data transmission system in which CDMA multiple access is applied, the receiver having a decorrelating detector. In order that the receiver can function effectively both in the event of multiuser interference and on a multipath channel, the decorrelating detector of the receiver has separate equalizers for equalizing the effect of the multipath channel in the received signal, and filters matched with the codes contained in the received signal, and multipliers for multiplying the received signal by the inverse matrix of the cross-correlation matrix of the codes contained in the received signal.

13 Claims, 3 Drawing Sheets

RECEIVING METHOD AND RECEIVER

This application claims benefit of International application PCT/FI95/00451 filed Aug. 23, 1995.

BACKGROUND OF THE INVENTION

The invention relates to a receiving method in a data transmission system in which a CDMA multiple access method is applied and a decorrelating detector is used in the detection of a received signal.

CDMA (Code Division Multiple Access) is a multiple access method based on a spread spectrum technique, and it has recently been put into use in cellular radio systems in addition to earlier developed FDMA (Frequency Division Multiple Access) and TDMA (Time Division Multiple Access Methods). CDMA has many advantages over the earlier developed methods, such as simplicity of frequency planning, and spectrum efficiency.

In a CDMA multiple access method, a narrow-band data signal of a user is multiplied to a relatively broad band by a spreading code having a much broader band than the data signal. Band widths used in known test systems include e.g. 1.25 MHz, 10 MHz and 25 MHz. The multiplication spreads the data signal over the entire band to be used. All the users transmit simultaneously on the same frequency band. On each connection between a base station and a mobile station, a different spreading code is used, and the signals of the users can be distinguished from one another in the receivers on the basis of the spreading code of the user. If possible, the spreading codes are selected in such a way that they are mutually orthogonal, i.e. they do not correlate with one another.

Correlators or matched filters in CDMA receivers implemented in a conventional manner synchronize with the desired signal, which is identified on the basis of the spreading code. In the receiver, the data signal is restored to the original band by multiplying it by the same spreading code as was used in the transmission step. Ideally, the signals that have been multiplied by some other spreading code do not correlate and are not restored to the narrow band. In view of the desired signal, they thus appear as noise. The object is to detect the signal of the desired user from among a plural number of interfering signals. In practice, the spreading codes may partly correlate, and in such instances the signals of the other users make it more difficult to detect the desired signal, by distorting the received signal non-linearly. This interference caused by the users to one another is called multiuser interference.

Apart from multiuser interference, another factor that impairs performance in a cellular radio system is multipath propagation. In a typical cellular radio environment, a signal propagates from a transmitter to a receiver along many different paths. This multipath propagation results from the signal being reflected from surfaces, such as buildings, in the vicinity of the radio path. There is often no direct line of sight between the transmitter and the receiver, whereby the receiver does not receive one strong, directly propagated signal, but several reflected signal components that are of approximately the same power and have propagated along different paths. Since the paths have been different in length, the signals are slightly out of phase.

In conventional CDMA receivers intended for a multipath environment, so-called RAKE technology has been applied. A RAKE receiver comprises several correlators, each of which is able to synchronize with a signal component propagated along a different path, the received signal components being able to perform combination and detection in the receiver in an advantageous manner. The multipath propagated signal components can thus be utilized. A conventional RAKE receiver, however, is not able to cancel multiuser interference. For example, when multiuser interference is strong and the signal of one user is much stronger than those of the other users, the other users may be disconnected. This kind of situation may arise, for example, at a base station when one of the users is very close to the base station and the other users are further away. Without immediate power adjustment, the nearest user prevents the other users from being heard at the base station receiver.

One receiver solution operating in an environment with multiuser interference is a so-called decorrelating detector, which cancels multiuser interference by multiplying by the inverse matrix of the cross-correlation matrix of the spreading codes. Known decorrelating detectors, however, have been presented only on a Gaussian noise channel, and it has been difficult to apply them to a changing multipath channel, since changing of the correlation matrix in accordance with the changes on the channel has been complicated as regards computation. A decorrelating detector is discussed in greater detail in R. Lupas, S. Verdu: 'Linear Multiuser Detectors for Synchronous Code-Division Multiple Access Channels,' IEEE Transactions on Information Theory, Vol. IT-35, p. 123–136, January 1989, and R. Lupas, S. Verdu: 'Near-Far Resistance of Multiuser Detectors in Asynchronous Channels,' IEEE Transactions on Communications, Vol. COM-38, March 1990,

SUMMARY OF THE INVENTION

The object of the present invention is to provide a receiver that is capable of functioning effectively both in the event of multiuser interference and on a multipath channel, i.e. in a typical cellular radio environment.

This is achieved with a receiving method of the type described in the forgoing BACKGROUND section, the method being characterized in that in the decorrelating detector, the effect of the multipath channel on a received signal is first equalized with an equalizer, whereafter the equalized signal is decorrelated using a cross-correlation matrix.

The invention also relates to a receiver in a data transmission system in which the CDMA multiple access method is applied, the receiver comprising a decorrelating detector. The receiver of the invention is characterized in that the decorrelating detector comprises: separate means for equalizing the effect of the multipath channel in the received signal; filters matched with the codes contained in the received signal; and means for multiplying the received signal by the inverse matrix of the cross-correlation matrix of the codes contained in the received signal.

The basic idea of the receiving method according to the invention is to divide the reception into two: channel equalization performed with an equalizer, and decorrelation performed using a constant matrix. In a decorrelating detector of the invention, inversion of the correlation matrix is separate from the equalization of the channel effect, so any changes on the channel affect only the equalizer, which is easy to update, rather than the correlation matrix, which is complicated to invert as regards computation.

The receiving method and receiver according to the invention can be applied both in a synchronous and in an asynchronous system. In the latter, multiplication by a decorrelation matrix is slightly more complicated than in the former, but there are various alternative ways of performing the multiplication.

The receiver of the invention can also be implemented such that the above decorrelating detector functions as a first stage in a receiver, and the more accurate bit estimates are then computed in the following stages. This is a so-called multistage receiver.

BRIEF DESCRIPTION OF THE DRAWINGS

In the following the invention will be described in greater detail with reference to the examples illustrated in the attached drawings, in which.

DETAILED DESCRIPTION

The invention is applicable to all kinds of CDMA data transmission systems, but it is especially well-suited for systems in which a signal travels on a radio path and the above described problems concerning reliable reception of signals are severe. In the following, the invention will be described in greater detail in a cellular radio system without, however, limiting it thereto.

Figure 1:
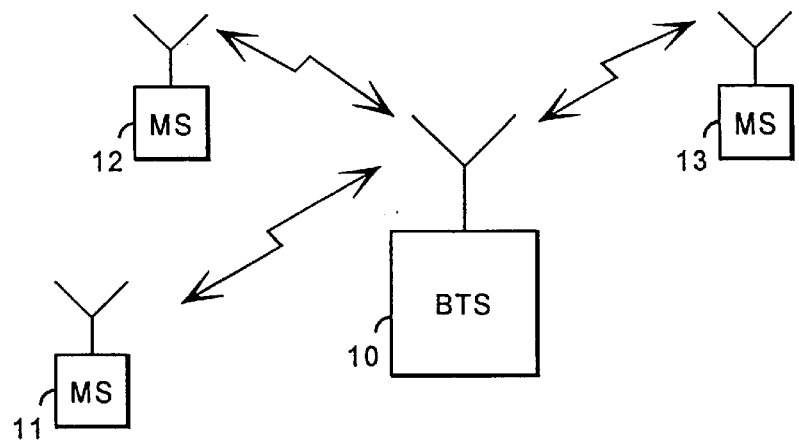
FIG. 1 shows part of a cellular radio system to which the method of the invention preferably is applied.

FIG. 1 shows part of a cellular radio system in which the method according to the invention can be applied. Each cell in a cellular radio network comprises at least one base station 10 communicating with subscriber stations 11 to 13 located within its area. The base station transmits calls from the mobile stations through a base station controller, a mobile exchange or the like to a public telephone network or to another mobile station.

All the mobile stations transmit at the same frequency to the base station 10, which distinguishes the transmissions of different mobile stations on the basis of respective different spreading code of each mobile station. As described above, the signals of the mobile stations may interfere with one another. The signals of the mobile stations can also propagate along several different paths to the base station. Further, the base station sends transmissions to all the mobile stations in its area at a same frequency—which however is different from the frequency used in the other direction of transmission—using a different spreading code for each connection, on the basis of which the respective mobile stations identify the respective signal intended for their reception. The signal transmitted by the base station to each mobile station in its area also undergoes multipath propagation or may do so.

In the method of the invention, a signal received by an antenna in a receiver is transmitted through radio frequency parts and other necessary signal processing parts, to an equalizer, which equalizes the effect of the multipath channel in the received signal. The equalization can be implemented, e.g. using adaptive filters, which are updated, if necessary, on the basis of measurements taken from the received signal. The system may be, e.g., a decision feedback system, in which the adaptive filters are controlled by the later stages of the receiver. The thus; obtained signal is forwarded to filters matched with the spreading codes used, and in the filters the signal can be restored to the original band. The matched filters output the signal of the respective users with the respective spreading codes extracted. Each signal is further multiplied by the inverse matrix of the cross-correlation matrix of the spreading codes in accordance with the principle of the decorrelating detector. Each signal obtained by the respective multiplication is then forwarded to a detector, where a bit decision is made. The cross-correlation matrix comprises computed cross-correlations of the spreading codes used, and it indicates how much the signals of different users interfere with one another. When the output signal of the matched filters is multiplied by the inverse matrix of this matrix, the effect of signals from other users can be reduced in the signals desired, i.e. the operation reduces the effect of multiuser interference on the received signal. The principle of the decorrelating detector is described in greater detail in the references mentioned above. Since the effect of the multipath channel has already been equalized in the signal with the adaptive filters, the inverse matrix, which is complicated to compute, can be held constant in the method of the invention.

In another embodiment of the invention, the method of the invention is applied in a so-called multistage receiver such that the decorrelating detection according to the invention is used as a first stage of a receiver in the manner described above, and the signal multiplied by the inverse matrix is forwarded to a second stage of the receiver, in which the signal can be re-detected or processed by a desired multiuser interference method to obtain an even more accurate detection result. Data bit estimates obtained from the decorrelating detector can be improved, e.g. by decision feedback interference cancellation, in which interference signals are regenerated and extracted on the basis of the bit estimates. Signals from which interference has been cancelled can thus also be used for filter adaptation and channel estimation.

In the following, the method of the invention will be described in three typical cellular radio environments.

Synchronous Users with the Same Multipath Channel

This corresponds to a situation where a base station is transmitting to subscriber stations. A mobile station receives the signal of the base station, the signal containing the signals of all the users, propagated along the same channel. Equalization can thereby be performed using one filter equalized by the channel before a filter bank matched with the codes, the output signal of the filter bank being then multiplied by the inverse matrix of the cross-correlation matrix. If the spreading codes used in a cell of the system are fixed, i.e. they do not change, the inverse matrix can always be held constant. If the number of users varies and some codes are not used, this is not problematic with respect to detection, since with regard to the unused codes, the situation corresponds to 0-power transmission and the decorrelating detector is independent of the power of the users.

Synchronous Users with Their Own Multipath Channels

This corresponds to a situation where subscriber stations are transmitting to a base station assuming that the subscriber stations can be synchronized with sufficient accuracy such that the symbols are received simultaneously without any differences in the delay signal of each user thereby propagates to the base station along a different path, and a different equalizer is needed for each signal, the equalizers being updated independently of one another. The matched filters and multiplication by a matrix can be implemented as in the previous example.

Asynchronous Users with Their Own Multipath Channels

Figure 2:
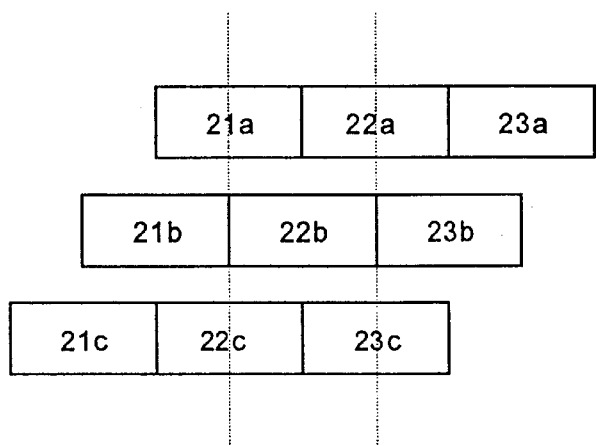
FIG. 2 illustrates an example for reception of asynchronous signals.

This corresponds to a situation where subscriber stations, which are not synchronized with one another, are transmitting to a base station. Symbols obtained from different users are here received asynchronously. The situation is illustrated by FIG. 2, which shows the arrival of the signals of three users a, b and c at a base station, as regards three symbols. Symbols 21a–23a of user a, symbols 21b–23b of user b, and symbols 21c–23c of user c all arrive slightly asynchronously such that different symbols partly overlap. As the base station receiver processes symbol 22b of user b, it thus regards the symbols 21a, 22a, 22c and 23c of the other users as simultaneous interference signals. With regard to a decorrelating detector, the problem is that the mutual phase differences of the codes of the users affect the correlation matrix and thereby its inverse value. Thereby multiplication by the inverse matrix is here slightly different from the examples described above. Each user has his or hers own equalizer as above, but the decorrelating part can be implemented, e.g. by using a so-called one-shot-type decorrelating detector. In a one-shot-type solution, each symbol is regarded as a separate user, i.e. in an asynchronous situation where there are K users, the detector assumes that there are 2K−1 users, due to the above-described overlapping of the frames. In the example of FIG. 2, where there are three users, a one-shot detector thus assumes that there are 2×3−1, i.e. 5, users, since the desired symbol 22b is interfered with by four different symbols. A one-shot-type detector is described in greater detail in S. Verdu: 'Recent Progress in Multiuser Detection,' Proc. 1988 Int. Conf. Advances in Communications and Control Systems, Vol. 1, p. 66–77, Baton Rouge, La., October 1988,. The inverse matrix of the correlation matrix can also be updated as a function of mutual delays of the users.

As stated above, the equalizer can be implemented, e.g. by adaptive filters, which aim at eliminating the effects of multipath propagation. In another embodiment of the invention, adaptive filters may also aim at minimizing more general errors, which leads to better results, e.g. with respect to strong interference or coloured noise.

Figure 3:
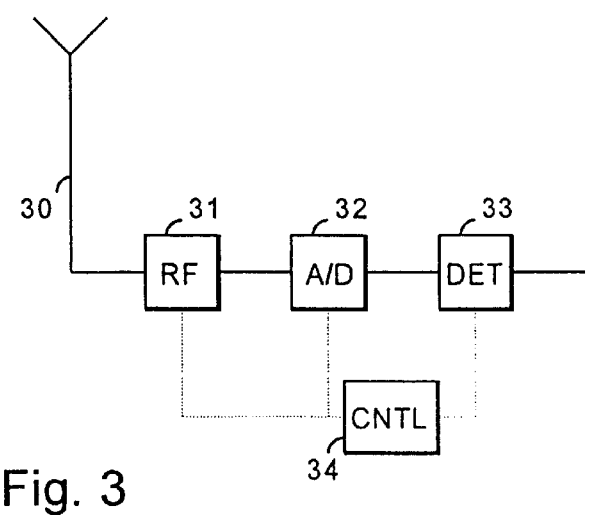
FIG. 3 is a block diagram illustrating the structure of a receiver according to the invention.

FIG. 3 is a block diagram illustrating the basic structure of a receiver according to the invention. The receiver comprises an antenna 30 with which a received signal is forwarded to radio frequency parts 31, where the radio frequency signal is converted to an intermediate frequency. From the radio frequency parts 31, the signal is supplied to an A/D converter 32, where the received analog signal is converted to digital form. The converted digital signal is supplied to detector means 33, and the outputted signal is then forwarded to the other parts of the receiver. The receiver also comprises control means 34, which control the operation of the above-mentioned blocks. The receiver naturally also comprises other components, such as filters, but for the sake of clarity and since they are not essential to the present invention, they have not been shown.

In a receiver of the invention, the detector means 33 may comprise one or more stages, the first stage being a decorrelating detector according to the invention.

Figure 4:
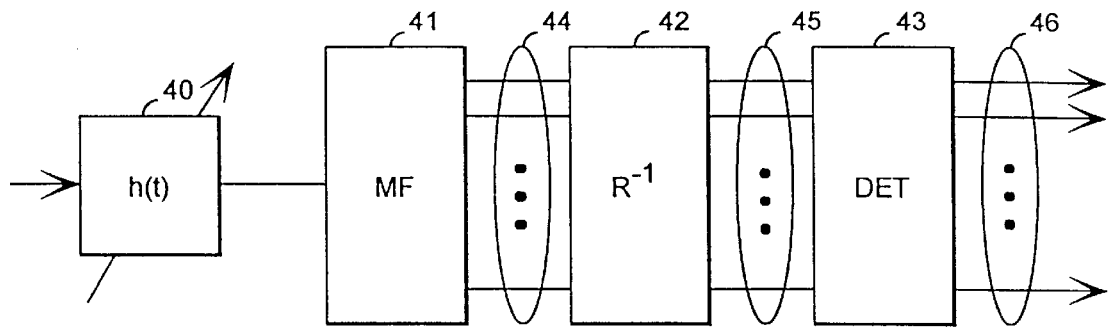
FIG. 4 shows implementation of a decorrelating detector according to the invention in greater detail in a synchronous system when the users have the same multipath channel.

FIG. 4 illustrates implementation of a decorrelating detector block according to one preferred embodiment of the invention in greater detail in a synchronous system when the users have the same multipath channel. The detector block comprises an equalizer 40, which here may be an adaptive filter matched with a measured channel transfer function h(t). The output signal of the equalizer is supplied to filters 41 matched with used spreading codes, and the spread spectrum signal is restored therein to the original narrow band. The number of matched filters is equal to the number of signals that are to be used in the detection, such as the number of users. A signal 44 obtained from the matched filters is supplied to means 42 and multiplied therein by the inverse matrix of the cross-correlation matrix of the spreading codes used. Resulting estimates 45 are forwarded to means 43 for processing and detection. Means 43 may comprise, e.g., a second receiver stage or an interference cancellation block. For block 42, the inverse matrix of the cross-correlation matrix can be computed beforehand on the basis of the cross-correlation values of the spreading codes used, and if the spreading codes used in the cells of the system are fixed, i.e. they do not change, the inverse matrix of block 42 can be held constant all the time.

Figure 5:
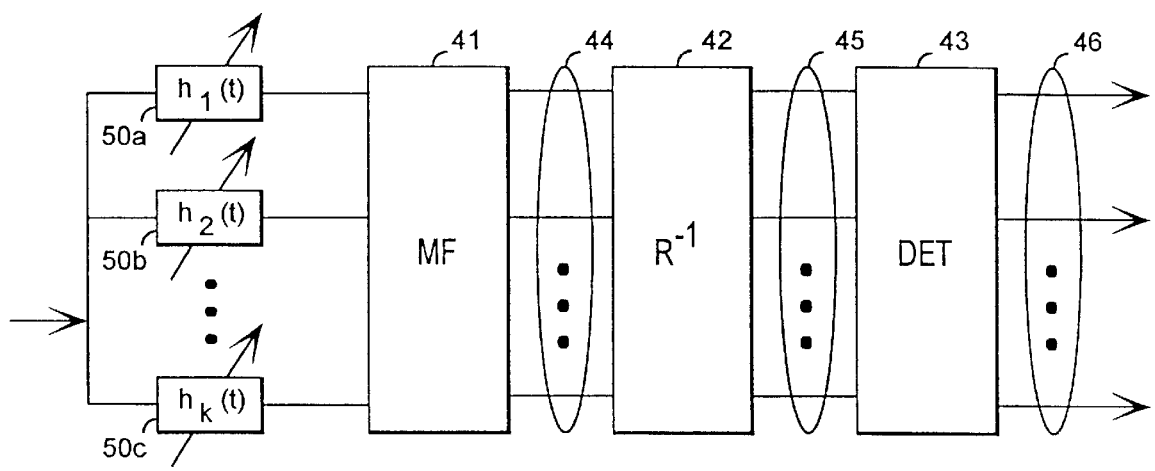
FIG. 5 shows one embodiment of a decorrelating receiver according to the invention in greater detail in a synchronous and an asynchronous system when each user has a different multipath channel.

FIG. 5 illustrates in greater detail implementation of a decorrelating detector block of the invention in a synchronous system when each user has a different multipath channel. The detector block here comprises a different equalizer 50a–50c for each user, each equalizer being, e.g., an adaptive filter matched with the measured channel transfer function $h_1(t)$–$h_K(t)$ of the user. The output signals of the equalizers are processed in the same way as has been described above.

FIG. 5 also illustrates implementation of a decorrelating detector block of the invention in greater detail in an asynchronous system when each user has a different multipath channel. The effect of the multipath channel is equalized in the same way as in the synchronous system, i.e. each user has his or her own equalizer 50a–50c. The decorrelating block 42, however, is more complicated than in the synchronous system. As described above, decorrelation can here be implemented using a one-shot-type decorrelating detector block, in which each symbol interval is processed separately.

Figure 6:
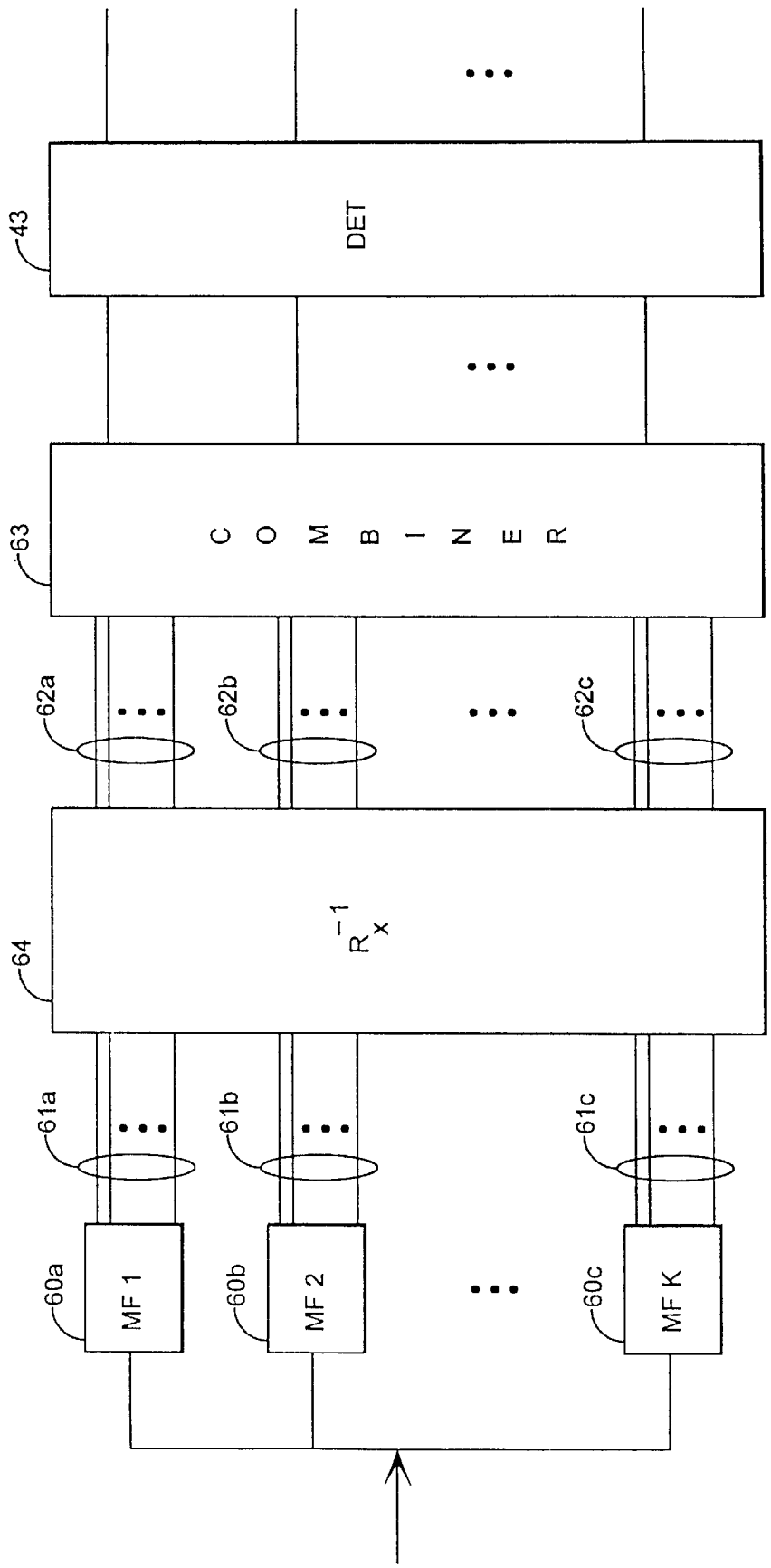
FIG. 6 shows an alternative embodiment of a decorrelating receiver according to the invention in greater detail in an asynchronous system when each user has a different multipath channel.

FIG. 6 illustrates an example of an alternative structure of a detector block according to the invention, in an asynchronous system. In the figure, there are K simultaneous users. Each user has his or her own matched filter bank 60a–60c which comprises a certain number L of correlators. The number L may be different in different filter banks, and the correlators are synchronized with the received signal components. The correlators can also be synchronized such that the correlators of each filter bank are adjusted to synchronize at fixed intervals, whereby they do not synchronize separately with each signal component. Let L here be equal in each filter bank. From each correlator bank 60a–60c, L received signal components 61a–61c are forwarded to means 64 and multiplied therein by a decorrelation matrix. The size of the decorrelation matrix is here K*L x K*L. The means output the decorrelated signals and power estimates 62a–62c of different paths for each signal component of each user, i.e. L decorrelated signals are obtained for each user. The decorrelated signals 62a–62c are forwarded to a combiner 63, which combines the L signal components of each user in a preferred way. The output signal of the combiner 63 is forwarded to the detector 43, which outputs the actual estimates.

Although the invention has been described above with reference to an example illustrated in the attached drawings, it is to be understood that the invention is not limited thereto but can be modified in many ways within the scope of the inventive idea claimed in the attached claims.

We claim:

1. A method for receiving in a data transmission system in which code division multiple access involving multipath propagation of signals each as respective signal components which are mutually out of phase by temporally varying amounts, and multiuser interference among respective signals, each signal communicating a succession of symbols translated into bits and transmitted at a rate of a plurality of chips per bit, spread by a respective spreading code is applied for detecting a particular received signal, from among a plurality of received signals, said code division multiple access using long codes, comprising:

equalizing effects of multipath signal component propagation on the received signal using an equalizer provided as a distinct functional element in a decorrelating detector to obtain an equalized signal which remains affected by multiuser interference and providing first samples thereof at a rate of at least one sample per chip;

detecting from said first samples said equalized signal in said decorrelating detector and providing second samples thereof at a symbol rate; and decorrelating said equalized signal from said second samples, using a cross-correlation matrix.

2. The receiving method according to claim 1, further comprising:

implementing said equalizer by using adaptive filters, said adaptive filters including;

filter equalizing multipath channel effects, providing output samples at said rate of at least one sample per chip; and code matched filtering filter output and said spreading codes, and correlating said code matched filtered output using said cross-correlation matrix of said despread symbols.

3. The receiving method according to claim 1, further comprising:

subjecting the equalized signal to interference cancellation after performing said decorrelating.

4. The receiving method according to claim 1, wherein:

said equalizing includes equalizing said effects in said particular received signal using as said equalizer a different equalizer than respective equalizers used for providing equalizing in regard to others of said plurality of received signals.

5. The receiving method according to claim 1, wherein:

said plurality of received signals comprises transmissions from a plurality of asynchronous users, further comprising:

updating said cross-correlation matrix based on mutual delays of the respective ones of said transmissions as received, wherein said cross-correlation matrix is a correlation matrix of said transmitted signals.

6. The receiving method according to claim 1, comprising:

practicing said decorrelating in a receiver which has multiple stages such that said decorrelating detector is followed in said receiver by other detector stages, wherein said decorrelating detector functions at said symbol rate.

7. A receiving method in a cellular radio system for signals for data transmission in which code division multiple access using long codes is used, comprising:

multiplying cellular radio system data transmission signals of each of a plurality of users, by a respective, different spreading code;

equalizing the effect of multipath signal component propagation in the respective multiplied signals as received in a receiver to obtain respective equalized signals;

supplying the equalized signals to filters matched with the spreading codes which were used for multiplying the respective signals, to obtain respective output signals;

forwarding the output signals of said filters to multipliers, and therein multiplying the respective output signals by an inverse matrix of said spreading codes used to obtain respective multiplied signals; and subjecting the multiplied signals to multi-user interference cancellation and estimation of received bits.

8. A receiver in a data transmission system in which code division multiple access involving multipath propagation of signals each as respective signal components which are mutually out of phase by temporally varying amounts, and multiuser interference among respective signals, each signal communicating a succession of symbols translated into bits and transmitted at a rate of a plurality of chips per bit, spread by a respective spreading code is applied for detecting a particular received signal, from among a plurality of received signals spread according to respective spreading codes having a cross-correlation matrix, said code division multiple access using long codes, comprising:

a decorrelating detector including an equalizer which equalizes effects of multipath signal component propagation in said signals received by said receiver, to provide for each of said received signals a respective equalized signal which remains affected by multiuser interference and first samples of each respective equalized signal at a rate of at least one sample per chip;

filters matched with codes contained in the respective equalized signals;

a multiplier which multiplies the respective equalized signals by an inverse matrix of the cross-correlation matrix of the codes contained in the respective received signals, to obtain respective decorrelated equalized signals; and said detector including another detector which detects said particular received signal from symbol rate samples of said decorrelated equalized signals.

9. The receiver according to claim 8, wherein:

said equalizer is a plurality of adaptive filters.

10. The receiver according the claim 8, wherein:

said multiplier is arranged to be implemented on a one-shot principle.

11. The receiver according to claim 8, further comprising:

a signal processor, located after said multiplier, which processes said signals, said signal processor being arranged to subject said decorrelated equalized signals to multi-user interference cancellation and detection.

12. The receiver according to claim 8, wherein:

said receiver has multiple stages of which said decorrelating detector is a first stage.

13. The receiver according to claim 8, wherein:

said decorrelating detector comprises a bank of matched filters providing an output signal for each said equalized signal;

each said filter bank comprises a respective correlator for each said signal component; and said decorrelating detector comprises another multiplier which multiplies said output signals of the matched filters by the inverse matrix of the cross-correlation matrix of the codes contained in the received signal components, a signal comb which combs the signal components, and a detector which detects the signal components.

\* \* \* \* \*